Patented Mar. 24, 1953

2,632,704

UNITED STATES PATENT OFFICE 2,632,704

METHOD OF PREPARING SILVER-HALIDE DISPERSIONS

Wesley G. Lowe, Louis M. Minsk, and William O. Kenyon, Rochester, N. Y., assignors to Eastman Kodak Company, Rochester, N. Y., a corporation of New Jersey No Drawing. Application March 31, 1950, Serial No. 153,298

6 Claims. (Cl. 95—7)

This invention relates to a method of preparing silver halide dispersions in which the silver halide is peptized by means of a copolymer essentially consisting of an acrylamide, an acrylic acid, and acrylonitrile or vinyl methyl ketone.

In the making of gelatin emulsions the silver halide is formed in a gelatin solution and this dispersion is then mixed with further gelatin to form the photographic emulsion. In the making of non-gelatin photographic emulsions it is ordinarily desirable to first prepare a dispersion of the silver halide in a solution which has peptizing properties and which is compatible with the material which is to be employed as the carrier for the silver halide in the emulsion. Polyvinyl alcohol which is useful as a carrier for silver halide in photographic emulsions is not a satisfactory peptizer for the preparation of high speed emulsions and, therefore, the use of some peptizing agent is frequently desirable for the preparation of the silver halide. A number of colloids have been suggested as useful in peptizing silver halide upon its preparation, some of these peptizers being starch acetate, diethanolamine cellulose acetate, and hydrolyzed gelatin.

One object of our invention is to provide a method of forming silver halide dispersions which are especially useful for preparing photographic emulsions. Another object of our invention is to provide peptizers for silver halide which have a high degree of compatibility with the non-gelatin vehicles which are ordinarily considered as useful for preparing photographic emulsions. A further object of our invention is to provide peptizers for the preparation of silver halide grains that are formed in a solution of the peptizer so that the inert inorganic salts which are present may be readily removed therefrom. Other objects of our invention will appear herein.

We have found that the copolymers of acrylamide, acrylic or methacrylic acid and acrylonitrile or methyl vinyl ketone when polymerized together in certain proportions forming polymers which may be soluble in water are eminently suitable for use as the dispersing or peptizing material in the preparation of silver halide dispersions for use in the preparation of silver halide photographic emulsions. The polymers which have been found to be most suitable for this purpose are those which result from polymerizing a composition in which the acrylic or methacrylic acid is within the range of 2½–15% by weight based on the total composition. The remainder of the composition is acrylamide and acrylonitrile or methyl vinyl ketone. If acrylonitrile is used, the ratio of acrylonitrile to acrylamide should be from 1:5 to 1:1. With the use of methyl vinyl ketone its ratio to the acrylamide should be from 1:12 to 1:5. Also, the relative viscosity of the polymer should be within the range of 1.1–1.5 and preferably within the range of 1.15–1.3. This relative viscosity of the polymeric compound as here used is the flow time of a solution of one gram of the polymer in 50 cc. of 0.5% aqueous ammonia divided by the flow time of a like amount of the solvent (.5% aqueous ammonia) without any polymer in solution therein, both measured in the same viscometer and at the same temperature.

The copolymers as referred to above have a minimum solution temperature above which they are soluble in water and below which they are insoluble. In their acid form this minimum solution temperature is preferably above room temperature but the presence of a base such as ammonium hydroxide, sodium carbonate, sodium hydroxide or the like in small amounts lowers the minimum solution temperature, this point becoming lower as the amount of base is increased until the point of complete solubility which ordinarily is attained at about 50% neutralization of the polymer. Because of this characteristic of these polymers, silver halide dispersions peptized by these polymers can be readily precipitated and washed prior to the formation of the finished photographic emulsion therefrom by mixing with the vehicle etc. The acid form of the polymer is that form in which substantially all of the carboxyls thereof are unneutralized.

The following examples illustrate the preparation of polymers useful as peptizing agents in accordance with our invention:

*Example 1.*—25 parts of acrylamide was placed in an all glass refluxing apparatus together with 10 parts of acrylonitrile, 2.5 parts of acrylic acid, 235 parts of a mixture of 70 volumes of water and 30 volumes of ethyl alcohol and 1 part of 30% hydrogen peroxide. The mass was heated on a 90° C. bath for two hours whereupon an additional 1 part of hydrogen peroxide was added, and the mixture was heated for an additional two hours. The mixture was then made acid with dilute nitric acid and immediately precipitated in 1.5 liters of methyl alcohol. The material was inclined to be rubbery when freshly precipitated but hardened with repeated extraction with fresh portions of methyl alcohol. When thoroughly washed, the material was dried in a vacuum desiccator. The product obtained had a nitrogen content of 19.55, a combined acrylic acid content of 6.52%, a minimum solution temperature of 48.9° C. and a relative viscosity of 1.19.

*Example 2.*—The same example was repeated except that 1 part of acrylic acid instead of 2.5 parts was used. A product was obtained having a nitrogen content of 20.15%, a combined acrylic acid content of 2.95%, a minimum solution temperature of approximately 44° C. and a relative viscosity of 1.15.

*Example 3.*—The preparation described in Example 1 was repeated except that 5 instead of 2.5 parts of acrylic acid was used. The product had a nitrogen content of 17.71%, a combined acrylic acid content of 12.54, a relative viscosity of 1.32 and a minimum solution temperature of 54° C.

*Example 4.*—50 parts of acrylamide was placed in an all glass reflux apparatus together with 35 parts of acrylonitrile, 5 parts of acrylic acid and 470 parts of a mixture of 70 volumes of water and 30 volumes of ethyl alcohol together with 2 parts of 30% hydrogen peroxide. The reaction mixture was heated on a 90° C. bath for two hours whereupon an additional 2 parts of 30% hydrogen peroxide was added and the heating was continued for an additional two hours. The reaction mixture was acidified with nitric acid, and the polymer formed was immediately precipitated in 1.5 liters of methyl alcohol. The polymer obtained was washed free of acid with methyl alcohol and dried in a vacuum desiccator. A product was obtained having 20.3% nitrogen, a combined acrylic acid content of 5.3%, a minimum solution temperature of 100° C. and a relative viscosity of 1.12.

*Example 5.*—24 parts of acrylamide was placed in an all glass refluxing apparatus together with 2.4 parts of acrylic acid, 2 parts of methyl vinyl ketone, 226 parts of a mixture of 70 parts by volume of water and 30 parts by volume of ethyl alcohol and 6 parts of 30% hydrogen peroxide. The mass was heated on a 90° C. bath for 1⅔ hours. The mass was then acidified with nitric acid and precipitated in methyl alcohol. The polymer which precipitated was extracted with methyl alcohol and dried in a vacuum desiccator. The product obtained had a minimum solution temperature of approximately 18° C. and a relative viscosity of 1.27, a combined acrylic acid content of 7.5% and a nitrogen content of 15.3%.

In its broadest aspects our invention comprises the mixing together of a water-soluble silver salt, such as silver nitrate, and a water-soluble halide solution, such as potassium bromide or potassium chloride in a dilute solution of the copolymer, such as described herein, preferably by introducing streams of each of the reactants into the polymer solution, or by adding the halide to the solution of copolymer and then running in the silver nitrate solution, while agitating that solution. The usual dilution of the polymer is 1–2% although where fine grained emulsions are desired, it is sometimes advisable to use a greater concentration of the polymer. The temperature in the peptizing procedure may be elevated or not as desired. It is preferred to have the pH of the solution at 5.5 or higher to obtain the best peptizing characteristics.

After the silver halide dispersion has been formed it may then be thoroughly mixed with a protective colloid, such as polyvinyl alcohol so as to form a silver halide emulsion, or it may first be acidified such as to a pH of 2–5 whereupon the dispersion coagulates and the silver halide grains formed are readily washed with acidified water thus removing alkali metal nitrate or any other water-soluble materials which may be present. They are then redispersed at a pH above 5.5, and preferably above 6, and are mixed with the protective colloid. Other materials such as sensitizers may also be incorporated. We have found that the polymers as described herein not only maintain their peptizing action in the presence of an excess of potassium bromide but, also, these peptizers permit Ostwald ripening and sulfur sensitizing to proceed readily so that emulsions of relatively high photographic speed can be obtained in contrast to the characteristics of many other materials which have been found to be useful as peptizers. The peptizers in accordance with our invention are compatible with polyvinyl alcohol, or with cellulose acetate protective colloids for silver halide, such as described in Salo U. S. Patent No. 2,110,491, granted March 8, 1938, or even with gelatin itself.

The following examples illustrate the use of polymers of the type described herein as peptizers in the preparation of silver halide emulsions in accordance with our invention.

*Example A*

A solution of a copolymer of acrylic acid, acrylamide and acrylonitrile, prepared as described in Example 1, was formed in the proportion of 13.5 parts of the polymer in 1125 parts of water, the pH of the solution being adjusted to 6.0 with sodium hydroxide. 74.5 g. of potassium bromide and 1.1 g. of potassium iodide was dissolved therein and the solution was heated to 57.5° C. A solution was made of 97 parts of silver nitrate in 1125 parts of distilled water, which solution was heated to 50° C. and was then run into solution A over a period of two minutes while rapidly stirring, and the mass thus formed was heated for fourteen minutes at 57.5° C. The dispersion was then cooled to 20° C. and the pH of the solution was lowered to 3.0 by the addition of sulfuric acid. The grains coagulated and were allowed to settle for fifteen minutes. The supernatant liquid was poured off and 2250 parts of distilled water containing 1 part of 2 normal sulfuric acid was added and the emulsion grains were thoroughly stirred. They were allowed to settle and the supernatant liquid was again decanted. After two such washes 500 parts of water were added and the grains were repeptized by heating for fifteen minutes at 50° C. with the pH of the solution adjusted to 7.5. The pH was then lowered to 6 and the emulsion was heated for fifteen minutes at 50° C. after adding .01 part of a labile sulfur-containing compound, such as allyl thiocyanate.

The thus-formed dispersion was then poured into 1000 parts of a 10% solution of polyvinyl alcohol (prepared by hydrolysis of V–80 polyvinyl acetate) and 900 parts of water was added. Wetting agent and 80 parts of a 4% borax solution in which the pH had been adjusted to 5.5 was added, and the emulsion was coated onto a film base. It was set by fuming with ammonia as described in Lowe and Griffin U. S. Patent No. 2,376,371 and dried. On exposure and processing it was found that the emulsion obtained was of suitable speed and gamma for a fine grain motion picture positive film.

Example B

The above procedure was repeated except that the polymer prepared in accordance with Example 4 was employed as the peptizing material. An emulsion having good photographic properties was obtained.

Example C

The procedure of Example A was repeated except that the peptizer employed was the copolymer of acrylamide, acrylic acid, and methyl vinyl ketone prepared by the process described in Example 5. An emulsion having good photographic properties was obtained.

It is to be understood that the examples given herein are illustrative rather than limiting and that the proportions specified above can be varied in operating in accordance with our invention. For instance, in the preparation of the copolymers of acrylamide, acrylic acid and methyl vinyl ketone which are satisfactory for use in our process the proportions of the various constituents may be varied such as by using instead of the proportions of methyl vinyl ketone called for by Example 5 proportions of methyl vinyl ketone, such as 3, 4, or 5 parts. As the proportion of methyl vinyl ketone is increased, the minimum solution temperature is also increased, that of the copolymer resulting when 5 parts of methyl vinyl ketone is used being 100° C. and the other polymers having a minimum solution temperature correspondingly graduated from that formed in Example 5.

The minimum solution temperature of the polymers as employed herein is found by determining the temperature at which the polymer begins to separate from a 2.5% solution of the polymer in water.

We claim:

1. A method of forming a dispersion of silver halide adapted to the preparation of photographic emulsions which comprises mixing together a water-soluble silver salt and a water-soluble inorganic halide in a dilute aqueous solution of a polymer selected from the group consisting of (1) the copolymers resulting from the polymerization of a mixture of an acrylic acid, acryl amide and acrylonitrile, the acrylic acid being 2½–15% of the total composition, the remainder being acrylonitrile and acrylamide in a ratio of the former to the latter of from 1:5 to 1:1 and (2) the copolymers resulting from the polymerization of a mixture of an acrylic acid, acrylamide and methyl vinyl ketone, the acrylic acid being 2½–15% of the total composition, the remainder being methyl vinyl ketone and acryl amide in a ratio of the former to the latter of from 1:12 to 1:5.

2. A method of forming a dispersion of silver halide adapted to the preparation of photographic emulsions which comprises mixing together a water-soluble silver salt and a water-soluble inorganic halide in a dilute aqueous solution of a copolymer resulting from the polymerization of a mixture of acrylic acid, acryl amide and acrylonitrile, the acrylic acid being 2½–15% of the total composition, the remainder being acrylonitrile and acryl amide in a ratio of the former to the latter of from 1:5 to 1:1.

3. A method of forming a dispersion of silver halide adapted to the preparation of photographic emulsions which comprises mixing together a water-soluble silver salt and a water-soluble inorganic halide in a dilute aqueous solution of a copolymer resulting from the polymerization of a mixture of acrylic acid, acryl amide and methyl vinyl ketone, the methyl vinyl ketone and acryl amide in the ratio of the former to the latter from 1:2 to 1:5.

4. A method of forming a dispersion of silver halide adapted to the preparation of photographic emulsions which comprises mixing together a water-soluble silver salt and a water-soluble inorganic halide in a dilute aqueous solution of a polymer resulting from the polymerization of a mixture of 25 parts of acryl amide, 10 parts of acrylonitrile and 2.5 parts of acrylic acid.

5. A method of forming a dispersion of silver halide adapted to the preparation of photographic emulsions which comprises mixing together a water-soluble silver salt and a water-soluble inorganic halide in a dilute aqueous solution of a polymer resulting from the polymerization of a mixture of 24 parts of acryl amide, 2 parts of methyl vinyl ketone and 2.4 parts of acrylic acid.

6. A method of forming a polyvinyl alcohol-silver halide emulsion which comprises mixing together a water-soluble silver salt and a water-soluble inorganic halide in a dilute aqueous solution of a polymer selected from the group consisting of (1) the copolymers resulting from the polymerization of a mixture of an acrylic acid, acryl amide and acrylonitrile, the acrylic acid being 2½–15% of the total composition, the remainder being acrylonitrile and acryl amide in a ratio of the former to the latter of from 1:5 to 1:1 and (2) the copolymers resulting from the polymerization of a mixture of an acrylic acid, acryl amide and methyl vinyl ketone, the acrylic acid being 2½–15% of the total composition, the remainder being methyl vinyl ketone and acryl amide in a ratio of the former to the latter of from 1:12 to 1:5, thereby forming a dispersion of the silver halide, followed by mixing the dispersed silver halide with polyvinyl alcohol as the protective colloid therefor.

WESLEY G. LOWE.
LOUIS M. MINSK.
WILLIAM O. KENYON.

REFERENCES CITED

The following references are of record in the file of this patent:

UNITED STATES PATENTS

| Number | Name | Date |
|---|---|---|
| 1,981,102 | Hagedorn et al. | Nov. 20, 1934 |
| 2,244,703 | Hubbuch | June 10, 1941 |
| 2,376,371 | Lowe et al. | May 22, 1945 |
| 2,461,023 | Barnes et al. | Feb. 8, 1949 |
| 2,484,456 | Lowe | Oct. 11, 1949 |
| 2,486,192 | Minsk | Oct. 25, 1949 |